United States Patent
Day

(10) Patent No.: US 11,196,259 B2
(45) Date of Patent: Dec. 7, 2021

(54) SYSTEMS AND METHODS FOR GRID MANAGEMENT

(71) Applicant: Trane International Inc., Davidson, NC (US)

(72) Inventor: Michael Sean Day, Sacramento, CA (US)

(73) Assignee: Trane International Inc., Davidson, NC (US)

( * ) Notice: Subject to any disclaimer, the term of this patent is extended or adjusted under 35 U.S.C. 154(b) by 123 days.

(21) Appl. No.: 16/401,386

(22) Filed: May 2, 2019

(65) Prior Publication Data
US 2020/0350764 A1 Nov. 5, 2020

(51) Int. Cl.
*B60L 55/00* (2019.01)
*H02J 3/14* (2006.01)
*H02J 3/32* (2006.01)
*H02J 3/00* (2006.01)

(52) U.S. Cl.
CPC ............... *H02J 3/14* (2013.01); *B60L 55/00* (2019.02); *H02J 3/32* (2013.01); *H02J 3/003* (2020.01)

(58) Field of Classification Search
CPC ..... H02J 3/14; H02J 3/32; H02J 3/003; B60L 55/00
See application file for complete search history.

(56) References Cited

U.S. PATENT DOCUMENTS

| | | | | |
|---|---|---|---|---|
| 7,333,880 | B2* | 2/2008 | Brewster | H02J 13/00002 700/286 |
| 9,300,137 | B2 | 3/2016 | Cherian et al. | |
| 9,514,428 | B2* | 12/2016 | Steven | G06Q 10/06 |
| 10,935,945 | B2* | 3/2021 | Morton | H02J 3/38 |
| 2009/0157529 | A1 | 6/2009 | Ehlers et al. | |
| 2014/0015445 | A1 | 1/2014 | Zhao | |
| 2016/0329708 | A1 | 11/2016 | Day | |
| 2019/0258212 | A1* | 8/2019 | Morton | H02J 3/38 |
| 2019/0372346 | A1 | 12/2019 | Day et al. | |

OTHER PUBLICATIONS

Paul Denholm et al.; Overgeneration from Solar Energy in California: A Field Guide to the Duck Chart; (NREL Technical Report); Nov. 2015; pp. 1-46; NREL/TP-6A20-65023; NREL at www.nrel.gov/publications; US.
California ISO Frequency Response Issue Paper; Market and Infrastructure Policy; Aug. 7, 2015; CAISO/M&ID/JC; pp. 1-14.

* cited by examiner

*Primary Examiner* — Dinh T Le
(74) *Attorney, Agent, or Firm* — Womble Bond Dickinson (US) LLP

(57) ABSTRACT

Embodiments of systems and methods for power demand management are described herein. In some embodiments the system uses demand response bidding to reduce or increase the load of a power system. Day ahead or real-time bids may be performed. In other embodiments, a virtual power plant is disclosed that dynamically aggregates multiple power assets to provide demand response services, frequency response services, and fast ramp services to the grid.

14 Claims, 5 Drawing Sheets

SYSTEMS AND METHODS FOR GRID MANAGEMENT

BACKGROUND

1. Technical Field

The present invention relates to systems and methods for managing an electrical distribution grid.

2. Background of Related Art

Generation assets in an electrical distribution grid can include generation plants that provide generally constant and controllable output, such as coal-fired generating plants, nuclear generating plants, and hydroelectric power plants. Generation assets may also include so-called "renewable" energy plants that provide intermittent output, such as photovoltaic (also known as PV or solar) plants having output that varies depending on sun position and cloud cover, or wind farms having output that is dependent on prevailing winds. Industrial and municipal sites may include on-site generation or energy storage assets such as gensets, solar, fuel cell, flywheel systems, battery systems, and so forth.

Electrical distribution grids which rely in whole or in part on intermittent generation assets face challenges when demand exceeds capacity, or, conversely, when excess electricity is generated for which there is no demand. Although these imbalance conditions can occur sporadically because of weather fluctuations, imbalance can also occur at anticipated periods during a 24 hour day. The so-called "duck curve" shows the timing imbalance between peak demand and renewable energy production that occurs over the course of a day. For example, excess capacity can occur at mid-day when solar plants are operating at peak capacity while peak demand can occur after sunset, when solar power is unavailable and families are at home using appliances, air conditioning, and so forth. In locations where a substantial amount of solar capacity has been installed, the amount of power that must be generated from sources other than solar or wind displays a rapid increase around sunset and peaks in the mid-evening hours, producing a graph that resembles the shape of a duck.

A system for decreasing grid imbalances that provides benefits to power consumers and asset operators would be a welcome advance in the art.

SUMMARY

In one aspect, the present disclosure describes a system for controlling the connected electric and cooling loads in electric grids with intermittent generation assets. In embodiments, a method for controlling the load in a system using demand response includes predicting the load required to run the components of the system, calculating the available load reduction using the predicted load requirement, placing a bid to a demand response organization based on the available load reduction, and reducing the system load by the available load reduction if the bid is called.

In another aspect, a method for reducing the load of an electrical system having a controllable load includes determining a load necessary to operate a sequence of processes, using the necessary load to determine an excess load, making a bid pertaining to controllable load using the excess load, and reducing the controllable load of the system by an amount equal to the bid.

In another aspect, the present disclosure describes a virtual power plant system for an alternating current electrical distribution grid having a target operating frequency. The virtual power plant system includes one or more grid assets associated with a site, a local management unit associated with the site in communication with each of the one or more grid assets associated with the site, and a controllable distributed energy resource management unit in communication with the local management system and configured to adjust an operating characteristic of the one or more grid assets.

In embodiments, the controllable distributed energy resource management unit is configured to receive a frequency response service request from a grid operator, query the local management unit to determine the availability of frequency response service at the site, and activate frequency response service at the site in response to the querying. One or more grid assets can include a variable speed drive unit having adjustable backfeed. Activating the frequency response service can include adjusting the backfeed of at least one of the one or more variable speed drive units. Adjusting the backfeed of a variable speed drive unit can include adjusting the phase angle of the power factor correction unit. Adjusting the backfeed of a variable speed drive unit can include adjusting the operating frequency of the variable speed drive unit. In some embodiments, one or more of the grid assets include a charging/discharging station. The charging/discharging station can be operatively connectable to a battery of an electric vehicle. Activating the frequency response service can include delivering alternating current from the charging/discharging station to the grid and/or can include adjusting the operating frequency of the charging/discharging station.

In another aspect, the present disclosure describes a virtual power plant system for an electrical distribution grid having one or more grid assets associated with a site, a local management unit associated with the site in communication with each of the one or more grid assets associated with the site, a controllable distributed energy resource management unit in communication with the local management system and configured to receive a demand response request from a grid operator and adjust the operation of the one or more grid assets in accordance with the demand response request.

In some embodiments, the demand response request can be one, some, or all of: a request to decrease electrical power received from the grid, a request to increase electrical power received from the grid, a request to decrease electrical power delivered to the grid, and a request to increase electrical power delivered to the grid. The one or more grid assets can include a charge/discharge station having a battery charging circuit having an adjustable input power, an inverter circuit having an adjustable output power, a control circuit coupled to the battery charging circuit and the inverter circuit, and a switching circuit to selectively couple the battery charging circuit and the inverter circuit to the electrical distribution grid.

When the demand response request is to receive power from the grid, the switching circuit couples the battery charging circuit to the grid and uncouples the inverter circuit from the grid to charge the battery. When the demand response request is to deliver power to the grid, the switching circuit couples the inverter circuit to the grid and uncouples the battery charging circuit from the grid to discharge the battery. When the control circuit receives a full disconnect command from the controllable distributed energy resource management unit, the switching circuit uncouples the battery charging circuit and the inverter circuit from the grid and the battery.

In another aspect, the present disclosure describes a method for controlling the load in a system using demand response that includes predicting the load required to run the components of a system, calculating the available load reduction using the predicted load requirement, placing a bid to a demand response organization based on the available load reduction, and reducing the system load by the available load reduction if the bid is called. In embodiments, predicting the load required to run the components of the system includes using a defined sequence. The defined sequence can include one or more adjustments to an industrial process that collectively provide a known energy modification to the energy consumption of the industrial process.

BRIEF DESCRIPTION OF THE DRAWINGS

Various embodiments of the disclosed system and method are described herein with reference to the drawings wherein.

Figure 1:
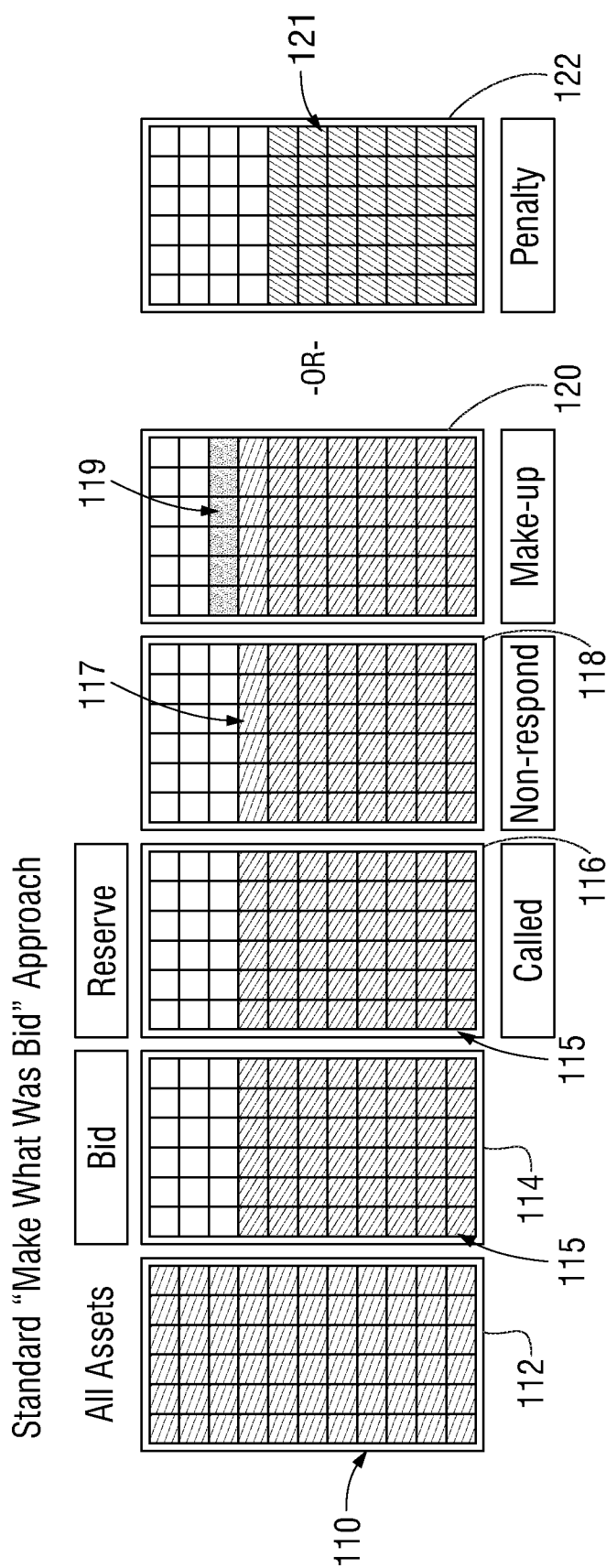
FIG. 1 illustrates an example illustrating a "Make What Was Bid" approach to grid management according to one or more embodiments of the present disclosure.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings, however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but as a basis for the claims and examples for teaching one skilled in the art to variously employ the present disclosure in any appropriately-detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary."

Aspects of the present disclosure are described herein in terms of functional block components and various processing steps. It should be appreciated that such functional blocks configured to perform the specified functions may be embodied in mechanical devices, electromechanical devices, analog circuitry, digital circuitry, and/or modules embodied in a computer.

Unlike classic demand response (DR) arrangements which call for electricity usage curtailment during peak grid loads, the controllable load system of the present disclosure provides not only for reduced energy usage, but for increased energy usage as well. Controllable loads provide an opportunity for consumers to play a significant role in the operation of the energy markets by reducing or shifting their electricity usage during peak events. Controllable loads also enable consumers to increase or shift their electricity usage during super off-peak or overcapacity "duck curve" events. Embodiments of the present disclosure have advantages when used with electrical distribution grids which rely in whole or in part on intermittent generation assets, such as wind or photovoltaic (PV) generation assets, which face challenges when demand exceeds capacity, or, conversely, when environmental conditions cause excess electricity to be generated.

Methods of engaging customers in demand response efforts include offering time-based rates such as time-of-use pricing, critical peak pricing, variable peak pricing, real time pricing, and critical peak rebates. Also included are direct load control programs which provide the ability for power companies to cycle air conditioners and water heaters on and off during periods of peak demand in exchange for a financial incentive and lower electric bills.

Consumers may be compensated for participating in the energy markets in the form of time-based rates, financial incentives from investor-owned utilities (IOUs), and financial incentives from other grid-affiliated entities. Though demand response programs are used by some electric system planners and operators as resource options for balancing supply and demand, capacity resources such as on-site energy storage and on-site generation facilities create many more opportunities for energy consumers to benefit from participating in the disclosed grid balancing system. Such programs can lower the cost of electricity in wholesale markets, and in turn, lead to lower retail rates.

The electric power industry considers DR programs to be an increasingly valuable asset whose capabilities and potential impacts are magnified by grid modernization efforts. For example, sensors can perceive peak load problems and utilize automatic switching to divert or reduce power in strategic places, removing the chance of overload and the resulting power failure. Advanced metering infrastructure expands the range of time-based rate programs that can be offered to consumers. Smart customer systems such as in-home displays or home-area-networks can make it easier for consumers to modify their behavior and reduce peak period consumption based on real-time and historical information on their energy consumption and costs. These programs also have the potential to help electricity providers decrease costs through reductions in peak demand and the ability to defer construction of new power plants and power delivery systems and specifically, those reserved for use during peak times.

In traditional DR load response programs, capacity is a factor of the total amount of electrical load "aggregated" into a portfolio. The entity in control of this portfolio has the right to dispatch these resources to produce a desired impact on the grid, such as a curtailment or increase in electric load.

DR resources often impose some form of sacrifice on a user. For example, a call to curtail load could result in a reduction in office lighting level, an increase in air conditioning temperature set points in a retail establishment, or the suspension of operation of an industrial process.

Impacts of sacrifice-type curtailment may be harmful or even catastrophic to the primary mission of the affected facility. Because of these negative impacts, customers who have signed up to participate in a DR load control program may not actually participate when the asset is called. This is particularly true when variables such as weather conditions force system operators to call for sacrifice multiple days in a row. Because of this participation erosion, the reliability of DR as a grid asset is lower than for conventional assets such as, for example, power generation assets.

In response, DR operators may compensate for this unreliability by subscribing more participants and controllable load than what is necessary to produce a given grid impact. This is important in both organized markets and vertically integrated markets for different reasons. In an integrated market, where a Load Serving Entity may possess generation capacity as well as serve as the local distribution provider, oversubscription of DR makes for more reliable planning of grid assets. For organized markets, where failure to deliver contracted amounts can result in significant penalties, oversubscription similarly allows inherently unreliable DR to be more reliable and reduce risks. For example, an aggregator that has 13.5 MW of controllable load can bid 10 MW into a market if they know that their maximum historic "miss rate" is, for example, 15%. Increasing the size and/or diversity of a portfolio of biddable assets decreases the miss rate and increases the confidence level that a DR bid will be met and that missed-bid penalties can be avoided or eliminated.

With this "oversubscribe" approach, the Demand Response Management System (DRMS) operates on a "Make What Was Bid" logic. That is, the DRMS will keep calling assets which were bid until the system reaches its goal, provided of course that sufficient oversubscription is achieved so that enough subscribers ultimately participate when called upon.

A derivative of this involves firmer assets in a controllable load portfolio. For example, consider a system having a portfolio of 52 buildings, each with Thermal Energy Storage, that together total 11 MW of controllable load. The portfolio is then bid in to an organized market for 10 MW of curtailment. When the time comes for the curtailment to be delivered, individual sites are dispatched by the DRMS until the 10 MW are delivered. Again, this approach is best characterized as "Make What Was Bid".

While a Make What was Bid approach works well for many different load types, it does not work well for all load types attempting to bid into a market, particularly critical loads. For example, consider a wastewater treatment plant that has a significant load. The processes at a wastewater treatment plant are complex, subject to considerable regulation, and if handled incorrectly, can have significant negative impacts. However, there are within the bounds of prudent plant operation actions that can be taken that are safe and that can impact load. An example of this is diverting flow to a holding basin for processing at a later time. However, it remains challenging to incorporate these potentially safe load-modifying activities, known as Sequences of Operation (or Sequences), into a standard DRMS.

The principal challenge is one of priority. In typical Automated DR (called ADR) systems the DRMS often has supremacy. In an ADR system, when the DRMS dispatches a demand response request to the controlled loads, the affected equipment will respond unless the users opt out of the called action. Again, this approach "makes" the load conform to what was bid. However, this approach does not align well with the needs of a wastewater treatment plant or other similar critical loads for the reasons explained above. For these types of critical loads, a system that "Bids What You Can Make" has many advantages.

In an embodiment, the "Bid What You Can Make" approach starts with a predictive algorithm. This code receives data about the load from a variety of sources such as, for example, models, historical data, and the like. It is then able to predict the power load of the plant for a given set of defined variables, such as, for example, flow conditions and ambient air temperature. It should be noted that this type of approach is not restricted to wastewater treatment plants; other critical facilities or industrial processes, such as, for example, oil refineries, behave similarly. Wastewater treatment plants are only used herein as an example.

In addition to modeling a predicted load for a plant in its standard state given the defined variables, the system predicts the load impact of each of the defined sequences described above. For example, a system could predict that post treatment flow diversion might result in 500 KW in peak load reduction at a flow rate of 3 million gallons per day (3 MGD), but would also show that this same sequence could deliver 2,750 KW of curtailment at 7 MGD. This is particularly important in processes in which pumps, compressors and other devices are employed that unload according to a cube law, that is, the defined sequence impacts are non-linear. For example, water pumps and air compressors are characteristic of many types of rotary equipment in that the power-to-output ratio is non-linear. As flow increases towards maximum (100%), power consumption increases in accordance with cube law (e.g., at the cube of flow), so if flow doubles, power use increases by a factor of eight. While different pieces of rotary equipment have different flow characteristics, in general, they all follow the cube law curve or an approximation thereof.

In practice, this provides additional functionality to a Day Ahead Load Nomination System (DALNS) such as that disclosed in U.S. patent application Ser. No. 15/142,586, filed Apr. 29, 2016, entitled "DAY AHEAD LOAD NOMINATION SYSTEM" and assigned to the assignee of the present application, the entirety of which is hereby incorporated by reference herein for all purposes.

In a "Make What Was Bid" system, a value is bid into the system, the DRMS would call for the load, and penalties would accrue for failing to deliver. However, plant operators typically do not evaluate events in terms of load, rather, they consider activities in terms of processes and sequences. As a result, plant operators resist "Make What Was Bid" approaches because this effectively gives control of their facility to an outside party that is not part of the plant operations team, with potentially disastrous consequences.

The described "Bid What You Can Make" approach is fundamentally different from conventional "Make What Was Bid" systems. In the "Bid What You Can Make" approach, the plant operator does not choose abstract load values. Instead, the operator chooses a Defined Sequence of Operations (DSO), which can include modifications to an existing process, with which they are familiar and comfortable, as well as the time when it can be engaged. This fundamentally different approach to load management aligns more naturally with existing plant operations workflows because it expresses an energy bid in terms of a known and schedulable process. As a result, the described approach to may increase acceptance rate by critical facilities management and therefore, benefit overall grid performance.

Once a DSO is chosen by a plant operator as part of the DALNS, the system operates in a manner that is compatible with traditional market operations and/or scheduling. The load value calculated by the algorithm for the selected sequence is bid into the market or made available to the utility. The bids are either accepted or not (in a market system) or selected for use or not (in a utility-run system). For those that are accepted, they are scheduled and dispatched as are other resources, but the "dispatch" in this case is not direct control of individual pieces of equipment, but instead the direction to local control systems to execute the Defined Sequence of Operations that was bid by the plant operator. Advantageously, bids may be placed into a day-ahead market and or a real-time market.

Figure 2:
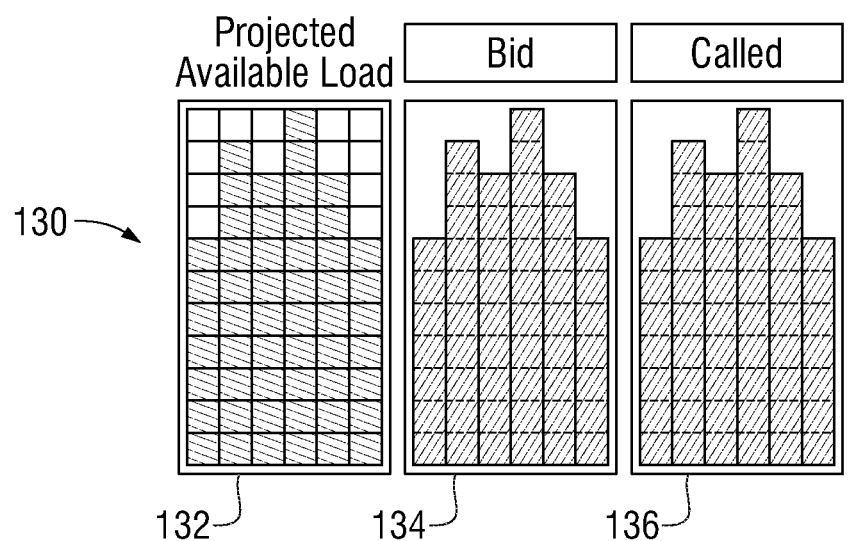
FIG. 2 illustrates an example illustrating a "Bid What Can be Made" approach, to grid management according to one or more embodiments of the present disclosure.

FIGS. 1 and 2 illustrate a number of grids which represent power on the vertical axis (e.g., KW or MW) and time on the horizontal axis. FIG. 1 illustrates the advantages of the "Bid What Can Be Made" (BWCBM) approach over a "Make What Was Bid" (MWWB) approach. FIG. 1 shows an example MWWB 110 and an example BWCBM 130. MWWB 110 includes grid 112 that illustrates an example of the load of all assets available for bidding. Grid 114 shows an example of a bid that can be made to a DR operator, as indicated by the lighter shaded portion 115. Box 116 illustrates the situation when the DR operator calls in the bid to the participant. In the example of 110, however, the participating customer cannot fully reduce (or increase) plant operations power consumption enough to meet what was bid, as shown in grid 118 in which the shortfall is indicated by the darker shaded portion 117. This will lead to a situation in which either the participant needs to "make up" the shortfall by committing make-up assets 119 to curtailment (or increase) of consumption to reach the amount that what was originally bid as shown in grid 120, or, accept a penalty for failing to meet the bid by delivering fewer assets 121 than were bid as shown in grid 122.

Turning to FIG. 2, with respect to BWCBM approach 130 and using an algorithm as discussed earlier, a participant can realistically predict what the load of operations will be for a particular day (as shown in grid 132). Such a prediction algorithm allows an operator to make a bid which can be comfortably made as illustrated in grid 134. If this bid is called, as seen in the example of grid 136, the operations of the participating location will not be adversely affected by the curtailment of load, and the bid can be met.

As discussed above, demand response curtailment is not the only effective way for a consumer to help the electric grid to manage resources. For example, it is possible for consumers on the grid to provide power back into the grid.

As an example, electric vehicles (EVs) are typically charged at a charging station overnight and are not offered as assets to the grid, even when they are not in use. Because many electric vehicles are typically charged over the relatively long overnight period, there may not be enough charging stations at a given location to charge all vehicles at the location simultaneously. Nevertheless, EVs, such as golf carts owned and operated in bulk at a golf course, resort, or other facility for example, offer a large potential opportunity for utilities and customers. Many locations have a late afternoon peak for energy usage, such as, for example, during long, hot summer afternoons when many golfers have completed their rounds and retired to the clubhouse. Alternatively, in areas where peak grid load occurs during cold winter nights due to pervasive resistance heating, the golf carts are typically sidelined and rarely used, if at all, during the winter months. Thus, when extreme weather events occur, golf carts are rarely at full utilization for their preferred task, and are therefore available for use in a utility focused program. Advantageously, these periods may also coincide with the period of both lowest usage of electric vehicles and highest value of energy resources to the grid.

Utilities may be interested in the use of customer's vehicles for several reasons. First, there is the opportunity for utilities to utilize both the power and energy in the units during peak periods. Second, batteries in a vehicle currently not in use will still typically contain energy that could be useful to a utility. Provided such energy is not depleted beyond the normal operating limits of the battery (e.g., preventing detrimental deep discharge), this energy can be made available as a grid resource. Beyond simple capacity, aggregated groups of vehicles can, with appropriate charging hardware, controls, and grid integration elements, provide even more valuable power quality services such as voltage or even frequency regulation. There is also a possibility to add fleets of vehicles, such as golf carts, to a larger grid services portfolio through installation of appropriate hardware and infrastructure, delivering benefits to all participants. Finally, so-called "second life" batteries which are no longer suitable for their original purpose may nonetheless be usable for bulk energy storage. For example, a fleet operator of EVs such as golf carts can repurpose old batteries as grid assets to extend the battery product life cycle and reduce the disposal and environmental costs associated with more frequent battery replacement.

The utility of this approach, at least in areas with high summer temperatures and/or low winter temperatures that coincide with system peak time, is that the hours when these services are needed may be the precise times when a fleet of vehicles is least likely to be needed by customary users. Whether it is 100° F. in Palm Beach (at 90% relative humidity), or 115° F. in Palm Springs, when the impacts that these vehicle fleets are of greatest value to the local grid is also the time when they are least likely to be in demand at a golf course. Conversely, in areas where there is a winter night time peak, such vehicles are also often available. For example, in Northern Minnesota, golf carts are often in storage from October through April, and peaks are during winter evenings. This makes these electric power storage assets eligible to regularly participate in a program.

Figure 3:
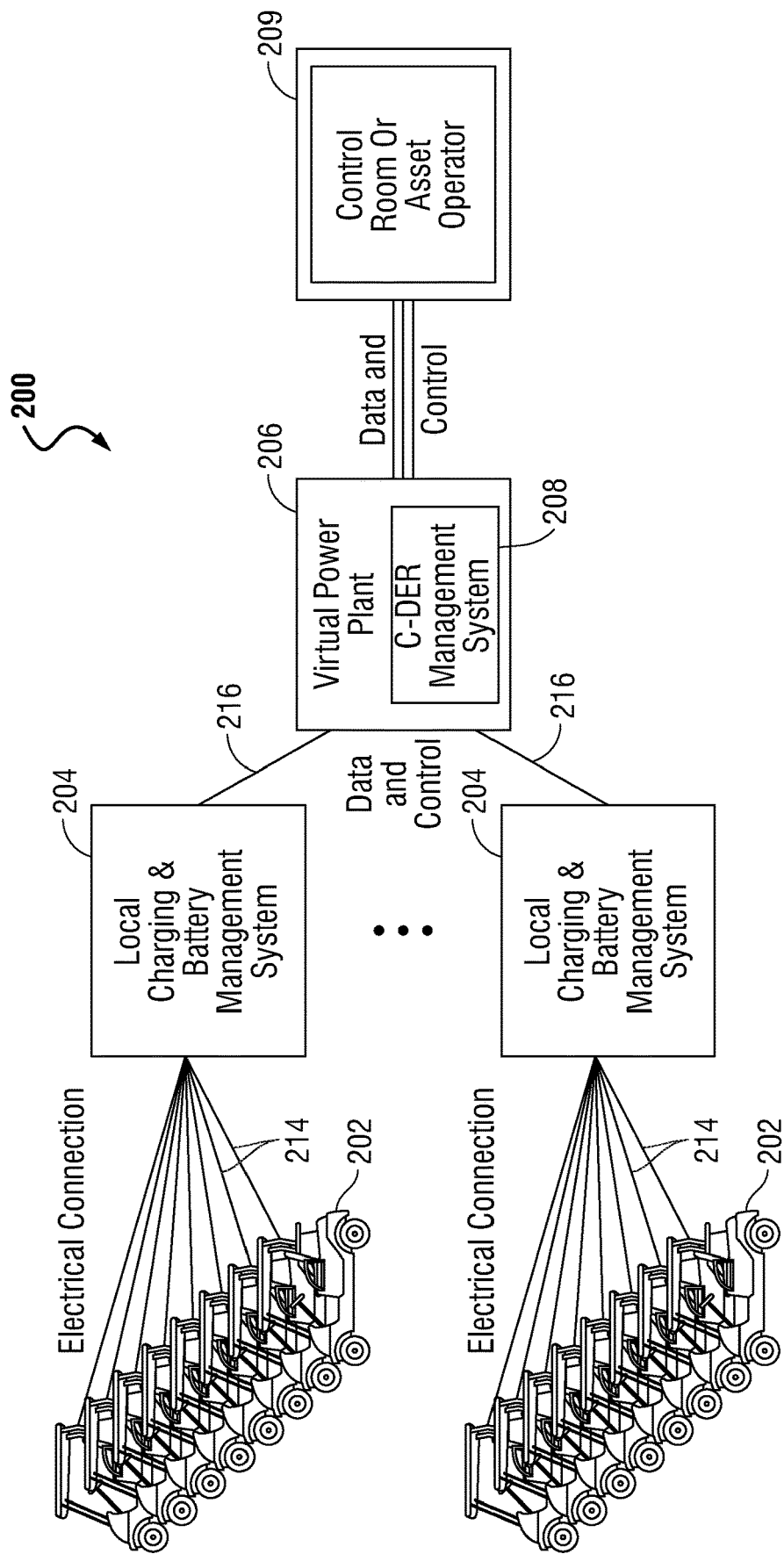
FIG. 3 illustrates an example of a fleet of electrical vehicles assisting an electrical grid according to one or more embodiments of the present disclosure.

FIG. 3 illustrates an example of a system 200 where fleet of electrical vehicles assisting an electrical grid according to one or more embodiments of the present invention.

Figure 4:
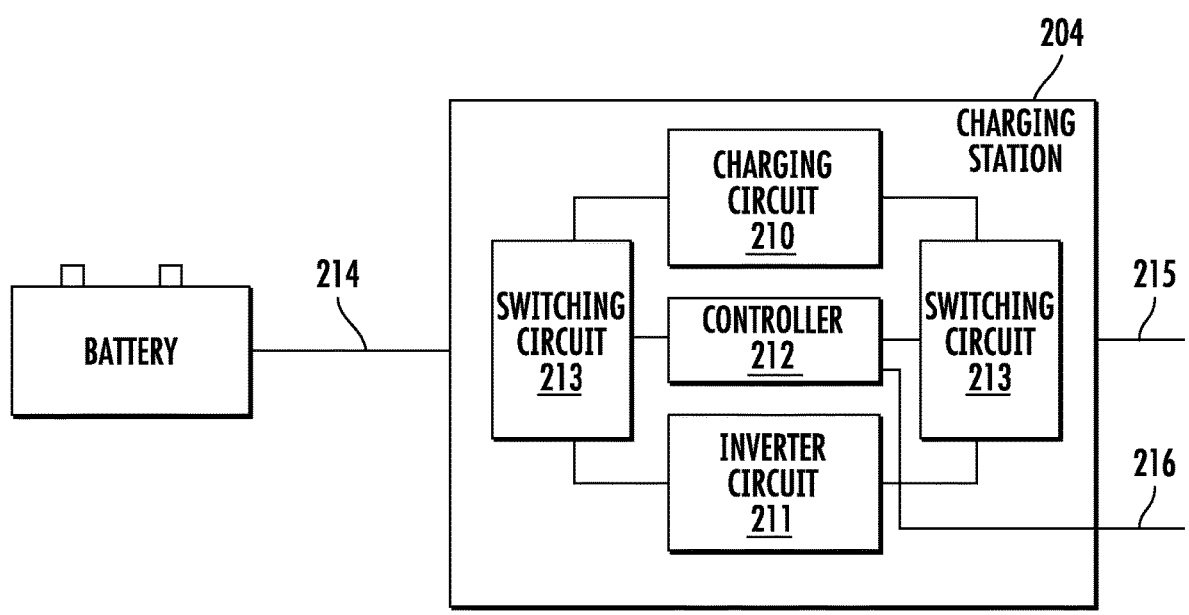
FIG. 4 illustrates an example charging station according to one or more embodiments of the present disclosure.

In the example of FIG. 3, at least one electric vehicle 202 is attached to a charging station 204 prior to a peak event. The charging station 204 may comprise battery management system attributes that compute existing state of charge, available rate of charge, temperature, rate of temperature change, age, total charge/discharge energy (e.g., total ampere-hours or kWh), number of charge/discharge cycles, and other battery status parameters of the attached electric vehicle 202. This battery management can be resident either in the charging station 204 or elsewhere. It should be noted that the parameters mentioned above are only exemplary and fewer, additional, or alternative parameters may be used. As seen in FIG. 4, charging station 204 includes a controller 212 that is operatively connected to Virtual Power Plant (VPP) 206 using data and control a communication link 216. Controller 212 communicates with charging circuit 210 and inverter circuit 211 to selectively enable a charging mode where charging circuit receives power from grid connection 215 to charge vehicle battery B via charge connection 214, or a discharging mode where inverter 211 receives power from vehicle battery B to feed power to the grid via grid connection 215. Controller 212 also communicates with switching circuit 213 to selectively connect or disconnect charging circuit 210 and inverter circuit 211 from the grid and/or battery B as required. For example, during charging mode, switch 213 connects charging circuit 210 to the grid and battery and disconnects inverter circuit 211. During discharging mode, switch 213 connects inverter circuit 211 to the grid and battery and disconnects charging circuit 210. Switching circuit 213 may also be activated to completely disconnect (a full disconnect) both charging circuit 210 and inverter circuit 211 under certain circumstances. For example, a weather signal received by controller 212 from VPP 206 that indicates an electrical storm is present or expected in the area of charging station 204 can cause switching circuit 213 to perform a full disconnect to protect charging station 204 from harmful transients that may be introduced by the electrical storm. In another example, charging station 204 may enter a service mode which requires a full disconnect for safety or technical reasons.

The individual devices and individual sites are aggregated into a single grid (VPP 206 by way of a Controllable Distributed Energy Resource (C-DER) management system 208. This system can perform multiple functions. In one aspect, it can aggregate the data from one or more individual sites into a single VPP asset. In another aspect, it has the ability to communicate the aggregated data to a distribution or transmission control room; receive signals from a control room; disaggregates the single VPP signal from a control room to instructions for one or more individual sites; and communicates those instructions down to the individual sites over a secure communication link. It should be noted that the functions of the VPP are merely exemplary and the VPP may perform more or less functions and still be within the scope and spirit of this invention.

In embodiments, the VPP may include one or more roadgoing EVs belonging to individual consumers. Consumer EVs, such as, for example, the Tesla Model S or Nissan LEAF, are typically charged overnight at the consumer's residence. By equipping residences and businesses consumers who own or lease an EV with a charging station 204, many assets that might otherwise be unable to participate in a grid management program, namely, the increasing number of roadgoing EVs in use, would be available to participate. A VPP consisting of a plurality of EVs can provide grid assets across a wide geographic region, which can be deployed globally to, for example, provide grid balancing to the entire region and/or be deployed more locally, using appropriate subsets of assets, to target localized grid conditions such as frequency response requests. The consumer can specify which time periods their EV is available as a grid asset, a minimum charge percentage of the EV's battery to be maintained below which the EV is unavailable for participation, cessation of grid participation in time to accommodate an scheduled "departure" time at which the EV is to be fully charged, and so forth. The consumer can use any suitable user interface to specify EV grid participation, such as without limitation a mobile app, web portal, or a dedicated control panel.

While the direct electric energy storage in the example embodiment described here is in the form of a battery, any form of direct electric storage, including flywheels, ultracapacitors and other formats, may be used, in any combination.

By gathering real-time, moment by moment data from the one or more individual sites, the C-DER management system can also gain the ability to perform valuable forecasting functions. These functions, using algorithms to analyze detailed data in the C-DER database, may allow the C-DER to report to a utility or asset owner on a forecasted basis the amount of power, energy, and other services available from the connected assets at various times. This data may also include data indicating how the available assets change as ambient conditions change.

At the local level, a battery management system converts the overall signal from the C-DER VPP management system into instructions to the inverter. This allows the system to either draw power into the batteries for charging, adding load to the grid as needed, or to reverse the flow of energy and add power back out to the grid as needed. A system so constructed could provide a wide variety of grid side products, with response times from 30 minutes, for example, down to sub-one second response for frequency response programs.

In another aspect, the disclosed C-DER Management System and the local devices can combine to offer autonomous frequency response control. Frequency response is the initial or primary response of grid resources and loads to mitigate and rapidly recover from changes in system frequency. During normal grid operating conditions, system frequency is maintained closely to the target sinusoidal frequency (generally 60 Hz in the Americas and 50 Hz elsewhere) and is standardized throughout the grid. All participants within an interconnected electric system are required to provide frequency response capability to maintain the correct system frequency in the event of a disturbance.

The C-DER Management system can report to the control room the availability of the system to provide frequency response services based upon the status of the system. When frequency response services are needed, the control room sends a signal to the VPP to enable frequency response, and to set the parameters under which the Frequency Response should occur. The C-DER Management system would in turn send this information down to the individual sites. At the local level, the individual battery management and inverter systems would then respond autonomously to provide Frequency Response following the instructions sent out by the control room. They would also log and report their activities on a "mileage" basis to the C-DER management system to facilitate billing for providing these services.

Figure 5:
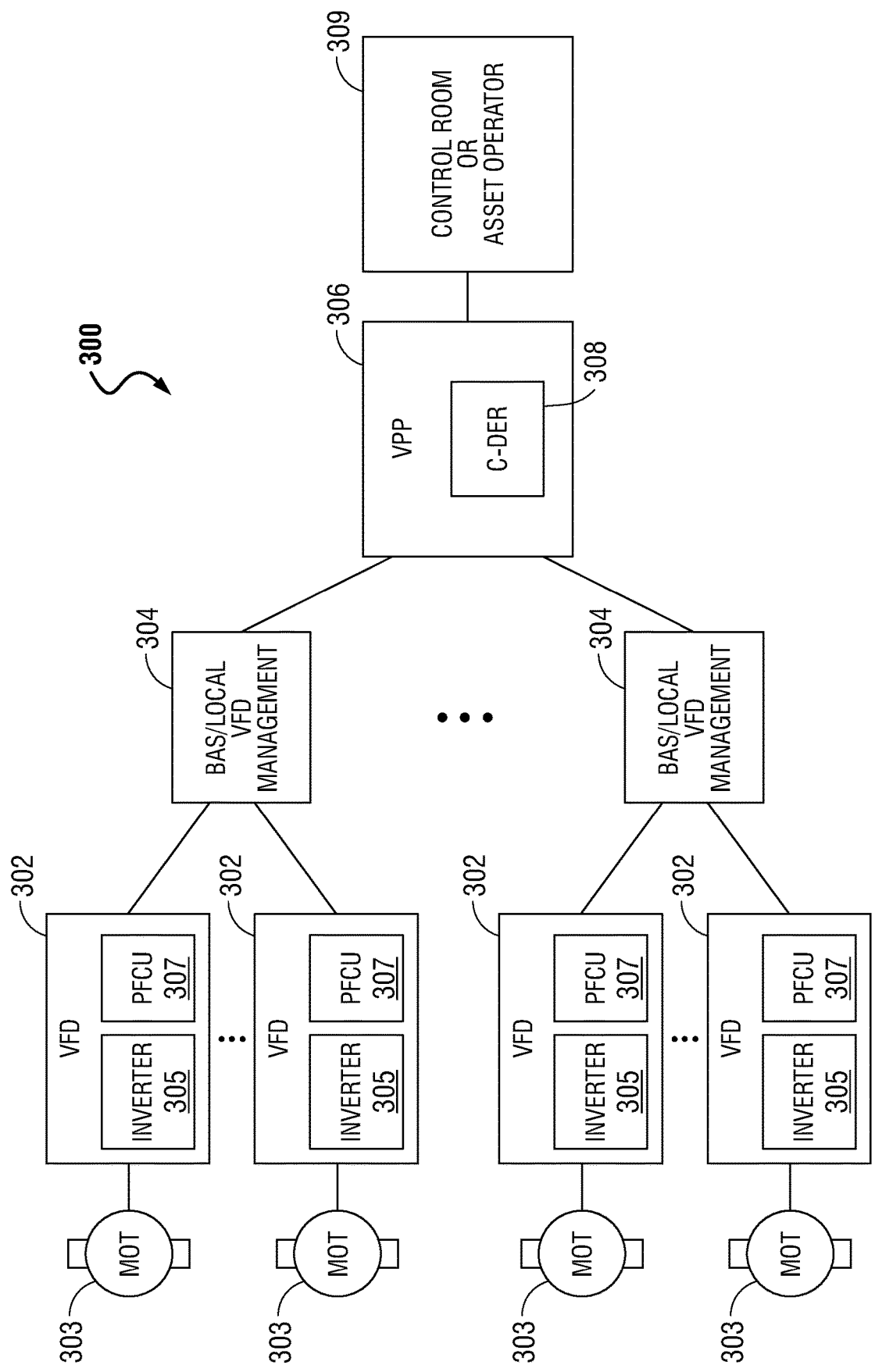
FIG. 5 illustrates an example of a variable frequency drive units assisting an electrical grid according to one or more embodiments of the present disclosure.

In yet another aspect illustrated in FIG. 5, a Virtual Power Plant system 300 enables Frequency Response (FR) services to be achieved using existing Variable Frequency Drives (VFDs) 302 as the controlled asset. VFDs by the nature of their operation produce a "back-feed" impact on the grid as described in co-owned U.S. Pat. No. 9,973,129, issued May 15, 2018, entitled "HVAC COMPONENTS HAVING A VARIABLE SPEED DRIVE WITH OPTIMIZED POWER FACTOR CORRECTION" and incorporated by reference herein. VFD 302 includes an inverter 305 to drive motor 303 at variable speed and a power factor correction unit 307 to adjust the back-feed. In one embodiment PFCU adjusts back-feed to the grid by altering the phase relationship between voltage and current. In this embodiment, the C-DER management system 308 communicates with a management system 304 at the facility, which can be a building automation system (BAS) and other local management system, to control the VFD 302 back-feed on a long-term or real-time basis. This, in turn, provides an intentional grid impact that counters disruptions to the frequency and sinusoidal waveform of the grid. In the present embodiment, rather than relying on battery and inverter to provide FR services, the rotational inertia of the motor 303 and associated driven element (e.g., a blower, compressor, pump, etc.) provide the energy. Since the Frequency Response market operates on a mileage basis, i.e., based upon the absolute value of energy injected or absorbed during each cycle of the AC waveform, the actual energy transfer largely nets out to zero. This, in turn, allows the system to fine tune by moving the asset to a slightly higher or lower gross operating level. Though FR VFDs for this type of service may require control and communications capabilities to be more robust, or equipped with updated components and/or operating firmware, that extra cost would be negligible compared to the cost of an equivalent array of batteries being used in a similar application. It would also provide an opportunity for existing VFD installations to help meet this growing need, and potentially provide a new revenue stream to the owners of those assets.

In another aspect, the disclosed electric vehicle virtual power plant (VPP) may be used as an asset to provide Dynamic Fast Ramp services. Dynamic Fast Ramp services enhance slow-responding assets by providing a synthetically fast response to dynamic demand-side resources and changes in grid condition. A VPP asset encompassing a bank of battery-powered vehicles or secondary-use batteries in combination with slower-responding assets such as, for example, wastewater treatment plants, portable water distribution system, air conditioning systems, and the like, can rapidly accommodate changes in demand to provide services to a larger Dynamic Fast Ramp portfolio at little or no additional cost.

It should be understood that a VPP in accordance with the present disclosure is not limited to a single asset class, and may include any combination of assets including without limitation charging stations, variable frequency drives, PV arrays, flywheel, compressed air storage, and so forth.

Although the invention has been described with reference to specific embodiments, it will be understood by those skilled in the art that various changes can be made without departing from the spirit or scope of the invention. Accordingly, the disclosure of embodiments is intended to be illustrative of the scope of the invention and is not intended to be limiting. It is intended that the scope of the invention shall be limited only to the extent required by the appended claims. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure. To one of ordinary skill in the art, it will be readily apparent that the systems and methods discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations are not expressly claimed in the claims and are, or are potentially, equivalents of express elements and/or limitations in the claims under the doctrine of equivalents.

What is claimed is:

1. A virtual power plant system for an alternating current electrical distribution grid having a target operating frequency, comprising:
   one or more grid assets associated with a site;
   a local management system associated with the site, and configured to communicate with each of the one or more grid assets associated with the site; and
   a computer configured to implement a controllable distributed energy resource management system that is configured to communicate with the local management system, and that is further configured to:
   receive a frequency response service request from a grid operator;
   query the local management system to determine availability of the frequency response service at the site; and
   cause the local management system to activate the frequency response service at the site, in response to the query and based on the availability.

2. The virtual power plant system of claim 1, wherein the one or more grid assets comprise a variable speed drive unit having adjustable backfeed.

3. The virtual power plant system of claim 2, wherein the frequency response service includes the local management system configured to adjust the backfeed of at least one of the one or more variable speed drive units.

4. The virtual power plant system of claim 3, wherein the variable speed drive unit comprises a power factor correction unit, and the local management system configured to adjust the backfeed of the variable speed drive unit includes the local management system configured to adjust a phase angle of the power factor correction unit.

5. The virtual power plant system of claim 3, wherein the local management system configured to adjust the backfeed of the variable speed drive unit includes the local management system configured to adjust an operating frequency of the variable speed drive unit.

6. The virtual power plant system of claim 1, wherein the one or more grid assets comprise a charging/discharging station.

7. The virtual power plant system of claim 6, wherein the charging/discharging station is operatively connectable to a battery of an electric vehicle.

8. The virtual power plant system of claim 6, wherein the frequency response service includes the local management system configured to deliver alternating current from the charging/discharging station to the grid.

9. The virtual power plant system of claim 6, wherein the frequency response service includes the local management system configured to adjust an operating frequency of the charging/discharging station.

10. A virtual power plant system for an electrical distribution grid, comprising:
    one or more grid assets associated with a site;
    a local management system associated with the site, and configured to communicate with each of the one or more grid assets associated with the site;
    a computer configured to implement a controllable distributed energy resource management system that is configured to communicate with the local management system, receive a demand response request from a grid operator and cause the local management system to adjust operation of the one or more grid assets in accordance with the demand response request, wherein the one or more grid assets includes a charge/discharge station comprising:
- a battery charging circuit having an adjustable input power;
- an inverter circuit having an adjustable output power;
- a control circuit coupled to the battery charging circuit and the inverter circuit; and
- a switching circuit to selectively couple the battery charging circuit and the inverter circuit to the electrical distribution grid.

11. The virtual power plant system in accordance with claim 10, wherein the demand response request is selected from the group consisting of a request to decrease electrical power received from the grid, a request to increase electrical power received from the grid, a request to decrease electrical power delivered to the grid, and a request to increase electrical power delivered to the grid.

12. The virtual power plant system in accordance with claim 10, wherein when the demand response request is to receive power from the grid, and the switching circuit is configured to couple the battery charging circuit to the grid and uncouple the inverter circuit from the grid to charge the battery.

13. The virtual power plant system in accordance with claim 10, wherein when the demand response request is to deliver power to the grid, and the switching circuit is configured to couple the inverter circuit to the grid and uncouple the battery charging circuit from the grid to discharge the battery.

14. The virtual power plant system in accordance with claim 10, wherein responsive to a full disconnect command from the controllable distributed energy resource management system, the switching circuit is configured to the battery charging circuit and the inverter circuit from the grid and the battery.

* * * * *